United States Patent [19]

Terada et al.

[11] Patent Number: 5,075,066
[45] Date of Patent: Dec. 24, 1991

[54] METHOD OF MAKING ORNAMENTS

[75] Inventors: Yasuharu Terada, Uozu; Yoshiyuki Horita, Toyama; Susumu Ishii, Kurobe, all of Japan

[73] Assignee: Yoshida Kogyo K.K., Tokyo, Japan

[21] Appl. No.: 450,442

[22] Filed: Dec. 14, 1989

[30] Foreign Application Priority Data

Dec. 16, 1988 [JP] Japan .................. 63-318928

[51] Int. Cl.⁵ .................. B29C 39/12; B29C 45/14
[52] U.S. Cl. .................. 264/247; 264/251; 264/254; 264/267; 264/273; 425/116; 425/120; 425/129.1
[58] Field of Search .......... 264/267, 273, 247, 246, 264/251, 254; 425/116, 120, 129.1

[56] References Cited

U.S. PATENT DOCUMENTS

| | | | |
|---|---|---|---|
| 2,568,274 | 9/1951 | Clark | 264/267 |
| 2,677,149 | 5/1954 | Fineran | 264/267 |
| 2,841,828 | 7/1958 | Osborn | 264/247 |
| 3,861,646 | 1/1975 | Douglas | 264/267 |
| 4,411,855 | 10/1983 | Fiebig et al. | 264/247 |
| 4,535,014 | 8/1985 | Wright | 264/246 |

FOREIGN PATENT DOCUMENTS 62-102406  6/1987  Japan .
62-102407  6/1987  Japan .

*Primary Examiner*—Jan H. Silbaugh
*Assistant Examiner*—Brian J. Eastley
*Attorney, Agent, or Firm*—Hill, Van Santen, Steadman & Simpson

[57] ABSTRACT

In a method of making an ornament, a metal ornament body having an internal groove opening at one end to an end edge of the metal ornament body and at an opposite end to front and rear surfaces of the metal ornament body is held between two relatively movable mold members while the one end of the internal groove is connected to a gate of the mold members and the opposite end of the internal groove communicates with mold cavities in the mold members. Then, a melted synthetic resin material is injected into the mold cavities through the gate and the internal groove. The gate mark is not formed on the outside surface of an ornamental member molded of synthetic resin but left on the end edge of the metal ornament body. The gate mark thus formed is normally hidden from view and does not deteriorate the aesthetical appearance of the ornament.

3 Claims, 6 Drawing Sheets

METHOD OF MAKING ORNAMENTS

BACKGROUND OF THE INVENTION

1. Field of the Invention

The present invention relates to a method of making ornaments such as pull tabs for slide fastener sliders, earrings, necklaces, brooches, etc. of the type including an ornamental member formed of synthetic resin and fitted with an ornament body made of metal.

2. Description of the Prior Art

Ornaments of the type described are generally made by two methods: (1) insert molding wherein a metal body is disposed in a mold cavity while a melted synthetic resin material is injected into the mold cavity to form a plastics ornamental member integrally molded with the metal body; and (2) snap-fitting wherein a metal body and a plastics ornamental member made separately from the metal body are assembled together by snap-fitting.

The insert molding is not satisfactory in that the melted synthetic resin material is injected directly from a gate into the mold cavity and hence a gate mark is clearly left on the outside surface of a molded ornamental member. An ornament having such ornamental member is defective from the aesthetic view. On the other hand, the snap-fitting requires a retainer portion provided on the metal body for retaining the plastics ornamental member. The retainer portion increases the overall thickness of an ornament. Another disadvantage associated with the snap-fitting method is that the integrality between the metal body and the plastics ornamental member is relatively weak and hence is likely to cause wobbling of the plastics ornamental member.

SUMMARY OF THE INVENTION

With the foregoing difficulties in view, it is an object of the present invention to provide a method of making an ornament without forming a gate mark on the outside surface of an ornamental member of synthetic resin integrally molded with a metal body.

According to the present invention, there is provided a method of making an ornament including an ornament body made of metal and an ornamental member formed of synthetic resin, the method comprising the steps of: (a) providing a pair of relatively movable mold members jointly defining therebetween a mold cavity complementary in contour to the shape of the ornamental member; (b) providing an ornament body made of metal and having at least one internal groove having one end opening to an end edge of the metal ornament body and an opposite end opening to at least one of front and rear surfaces of the metal ornament body; (c) holding the metal ornament body between confronting mold surfaces of the mold members, with said opposite end of the internal groove held in fluid communication with the mold cavity; and (d) introducing a melted synthetic resin material through the internal groove of the metal ornament body into the mold cavity to form an ornamental member of synthetic resin integrally molded with the metal ornament body.

Since a gate of the mold members is connected with the mold cavity not directly but with the agency of the internal groove of the metal ornament body, a gate mark is not formed on the outside surface of the ornamental member but left on the end edge of the metal ornament body. The gate mark thus formed is normally hidden from view and hence does not deteriorate the aesthetic appearance of the ornament.

The above and other objects, features and advantages of the present invention will become manifest to those versed in the art upon making reference to the detailed description and the accompanying sheets of drawings in which preferred structural embodiments incorporating the principles of the present invention are shown by way of illustrative example.

DETAILED DESCRIPTION

Figure 1:
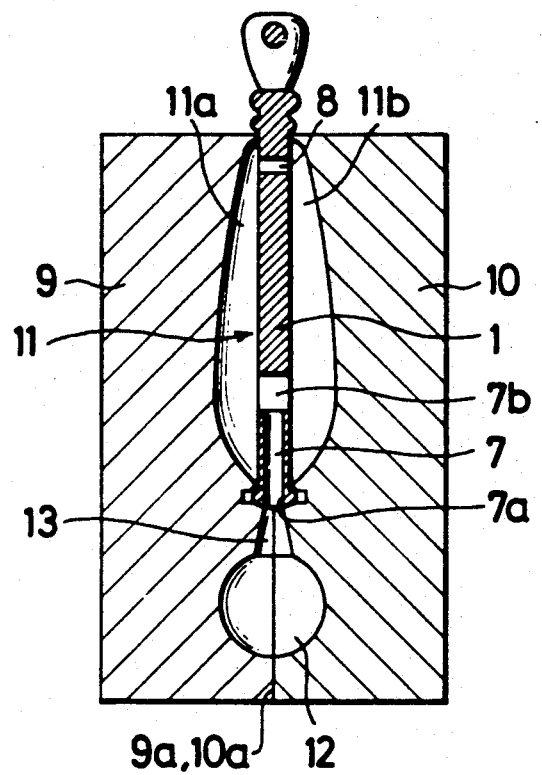
FIG. 1 is a cross-sectional view showing an injection-molding step for making an ornament according to the present invention.
Figure 2:
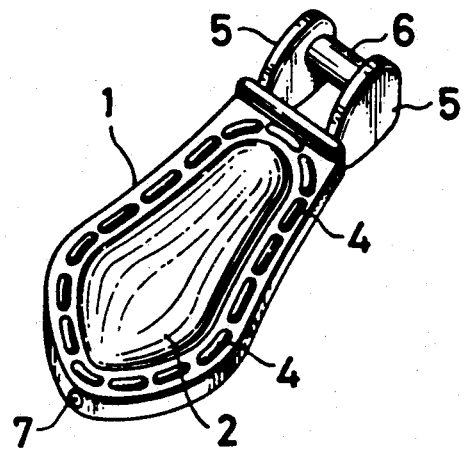
FIG. 2 is a perspective view of an ornament made according to the present invention.
Figure 3:
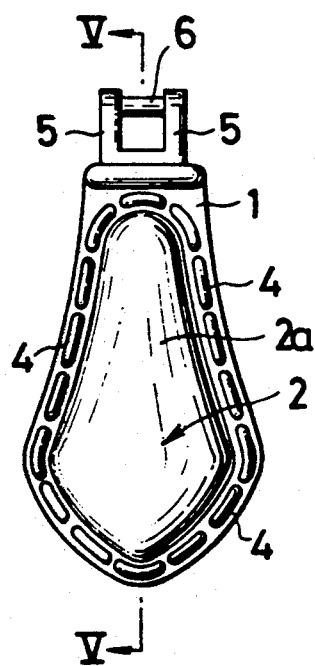
FIG. 3 is a front elevational view of the slider pull tab shown in FIG. 2.
Figure 4:
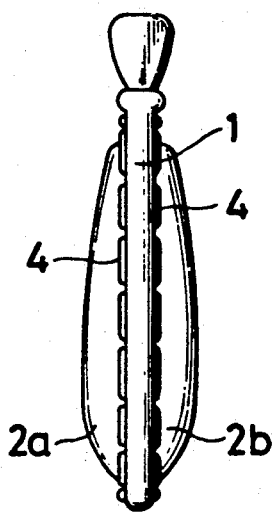
FIG. 4 is a side view of FIG. 3.

Referring to the drawings, wherein like reference characters designate like or corresponding parts throughout the several views, FIGS. 2 through 5 illustrate an ornament comprising a pull tab for slide fastener sliders made by a method according to the present invention.

Figure 5:
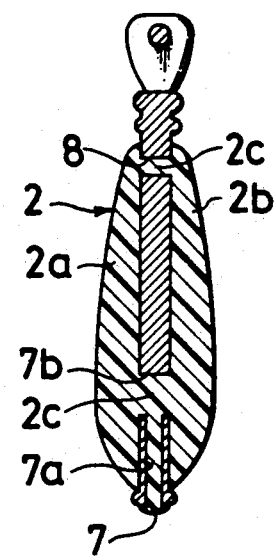
FIG. 5 is a cross-sectional view taken along line V—V of FIG. 3.
Figure 6:
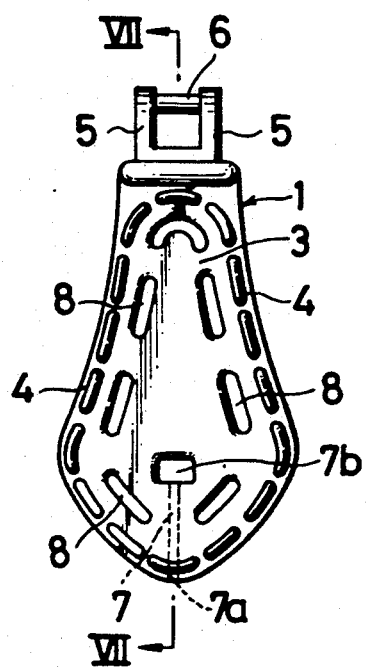
FIG. 6 is a front elevational view of a metal body of the ornament shown in FIG. 1.
Figure 7:
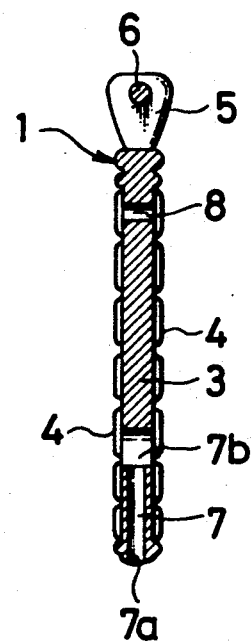
FIG. 7 is a cross-sectional view taken along line VII—VII of FIG. 6.

The slide fastener slider pull tab includes an ornament body 1 made of metal and an ornamental member 2 formed of synthetic resin and integrally molded with the metal ornament body 1. The metal ornament body 1, as shown in FIGS. 6 and 7, is formed of a flat elongate metal plate 3 having a plurality of ornamental ribs or projections 4 disposed on each side along the periphery thereof, and a pair of parallel spaced support lugs 5, 5 projecting from one end edge of the elongate metal plate 3 and supporting a transverse pivot shaft or pintle 6 adapted to be connected to a slide fastener slider (not shown). The metal ornament body 1 further has an internal groove 7 opening at one end 7a to the opposite end edge of the elongate metal plate 3 and at the opposite end 7b to front and rear (obverse and reverse) surfaces of the elongate metal plate 3 at a portion near the center of the elongate metal plate 3 for a purpose described below. The opposite end 7b of the internal groove 7 is enlarged. A plurality of elongate holes 8 is formed in the elongate metal plate 3 and extend across the thickness of the elongate metal plate 3 for connecting front and rear portions 2a, 2b of the ornamental members 2 (FIG. 5). The elongate holes 8 are inwardly spaced a distance from the ornamental projections 4.

The slide fastener slider pull tab of the foregoing construction is manufactured by injection molding on a pair of relatively movable mold members 9, 10 shown in FIG. 1. The mold members 9, 10 have a pair of mating mold surfaces 9a, 10a, respectively, having formed therein a pair of confronting mold cavities 11a, 11b complementary in contour to the shape of the front and rear portions 2a, 2b of the ornamental member 2 of the slider pull tab. The mold members 9, 10 further define a runner 12 connected with a nozzle of an injection molding machine (not shown), and a gate 13 extending from the runner 12 toward the mold cavities 11a, 11b.

For injection-molding, the metal ornament body 1 is held between the confronting mold surfaces 9a, 10a of the mold members 9, 10 with the end 7a of the internal groove 7 connected to the gate 12, as shown in FIG. 1. In this instance, the ornamental projections 4 on the metal ornament body 1 serves as positioning means for positioning the metal ornament body 1 with respect to the mold cavities 11a, 11b. The mold cavities 11a, 11b are held in fluid communication with the gate 13 through the internal groove 7. Further, the mold cavities 11a, 11b communicate with each other through the holes 8 in the metal ornament body 1. With this condition, a melted synthetic resin material is injected into the mold cavities 11a, 11b in the mold members 9, 10 through the runner 12, the gate 13 and the internal groove 7 in the metal ornament body 1, to form an ornamental member 2 (FIG. 5) having front and rear portions 2a, 2b connected together by a plurality of connectors 2c extending through the holes 8 and the end 7b of the internal groove 7. The injection-molded ornamental member 2 is cooled for a predetermined period of time. Upon expiration of the predetermined cooling time, the mold members 9, 10 are moved away from one another, and then an injection-molded article having the ornamental member 2 of synthetic resin injection molded with the metal ornament body 1 is released from the mold members 9, 10. Thereafter, the runner and gate portions (not shown) are removed from the injection-molded article. A slide fastener slider pull tab shown in FIG. 1 is thus manufactured.

According to the injection molding process described above, a gate mark is formed on the end edge of the slider pull tab which is normally hidden from view. The outside surface of the plastics ornamental member 2 is free from such gate mark and hence sightly in appearance, therefore, the slider pull tab has a high product value.

Figure 8:
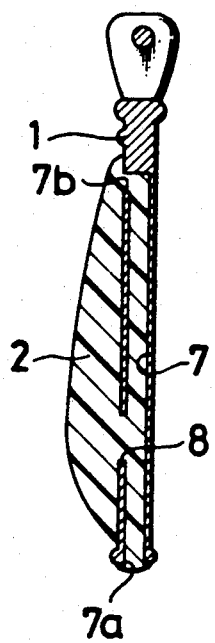
FIGS. 8, 9 and 10 are cross-sectional views showing different ornaments made in accordance with the present invention.

FIG. 8 shows a modified slider pull tab made according to the present invention. The modified slider pull tab includes an ornamental member 2 disposed on one side (normally front side) of a metal ornament body 1. The metal ornament body 1 has an internal groove 7 extending from one end edge toward the opposite end edge thereof and terminating short of the opposite end edge as indicated at 7b. A plurality of holes 8 (only one shown) extends from the front surface of the metal ornament body 1 to the internal groove 7. The slider pull tab is injection-molded on a pair of relatively movable mold members which are the same as those shown in FIG. 1 excepting that only one mold member has a mold cavity for the formation of the ornamental member 2.

Figure 9:
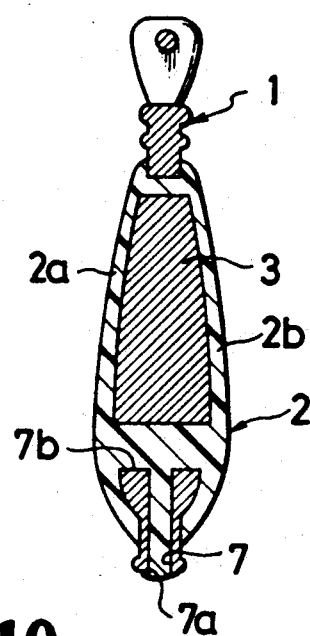

A modified slide fastener slider pull tab shown in FIG. 9 is similar to the slider pull tab shown in FIG. 1 but differs therefrom in that a metal ornament body 1 is spaced uniformly over its entire regions from the peripheral walls defining the respective mold cavities (identical to the mold cavities 11a, 11b shown in FIG. 1). To this end, the metal ornament body 1 is swelled such that the thickness of the metal ornament body 1 gradually increases from a peripheral edge toward an intermediate portion at which an outlet end 7b of an internal groove 7 is open. By using this swelled metal ornament body, an ornamental 2 injection-molded on the same mold members 9, 10 has a uniform thickness substantially over the entire region thereof. With this uniform thickness, the ornamental member 2 contracts uniformly over the entire region thereof as it is cooled within the mold cavities. The ornamental member 2 thus formed has an improved dimensional accuracy.

Figure 10:
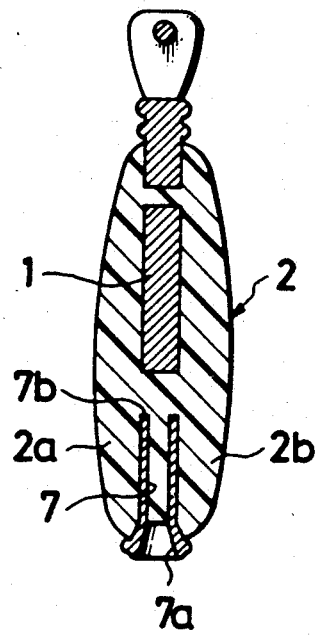

FIG. 10 shows another modified slider pull tab according to the present invention. The slider pull tab includes a metal ornament body 1 having an internal groove 7 whose inlet end 7a flares outwardly. With this outwardly-flaring inlet end 7a, the injection-molded synthetic resin material is broken or separated at the inner end extremity of the outwardly-flaring end 7a of the internal groove 7 when the gate portion is removed from the molded article. Accordingly, the flaring end 7a of the internal groove 7 is devoid of the synthetic resin material and hence the aesthetical appearance of the slider pull tab is further improved.

Figure 11:
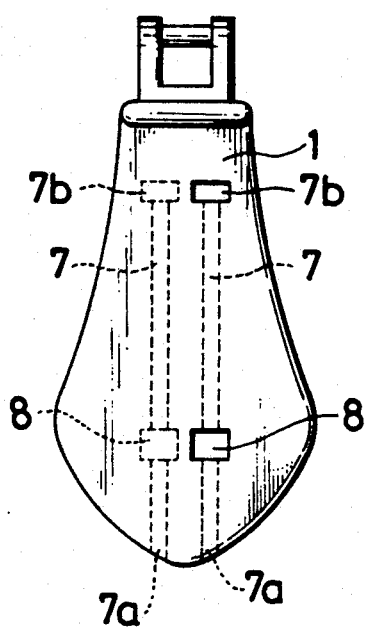
FIG. 11 is a front elevational view of a metal body used for making an ornament having a dual-colored ornament member.

A metal ornament body 1 shown in FIG. 11 is used for making a slider pull tab having an ornamental member 2 whose front and rear portions 2a, 2b are formed of different synthetic resin materials and/or have different colors. The metal ornament body 1 has a pair of parallel spaced internal grooves 7, 7 extending from one end edge toward the opposite end edge of the metal ornament body 1 and terminating short of the opposite end edge. One of the internal grooves 7 has an outlet end 7b opening to the front surface of the metal ornament body 1 as indicated by the solid lines in the same figure while the outlet end 7b of the other internal groove 7 opens to the rear surface of the metal ornament body 1 as indicated by the broken lines. The metal ornament body 1 further has two holes 8 extending respectively from the front and rear surfaces thereof to the respective internal grooves 7.

Figure 12:
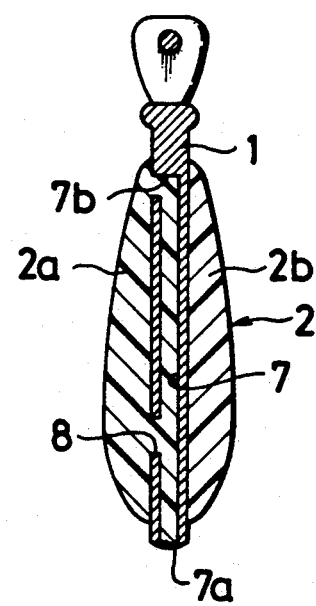
FIG. 12 is a longitudinal cross-sectional view of an ornament made by using the metal body shown in FIG. 11.

In injection-molding, the metal ornamental body 1 is set in mold members which are similar to the mold members shown in FIG. 1. In this instance, only one of the internal grooves 7 is connected with the gate of the mold members and a mold cavity is defined on each side of the metal ornament body 1. Then, a melted synthetic resin material is injected into one of the mold cavities through the one internal groove 7 to form a front ornamental member 2a (FIG. 12) molded on the front side of the metal ornament body 1. After the gate and runner portions are removed, a molded article composed of the metal ornament body 1 having the front ornamental member 2a is set again in the mold members. In this instance, the other internal groove 7 is connected with the gate and the front ornamental member 2a is received in the opposite mold cavity. Then, a melted synthetic resin material which is different in kind and/or color to the synthetic resin material of the front ornamental member 2a is injected into the one mold cavity through the gate and the other internal groove 7, to form a rear ornamental member 2b (FIG. 12) molded on the rear side of the metal ornament body 1. After the gate and runner portions are removed, a slider pull tab shown in FIG. 12 is completed.

Figure 13:
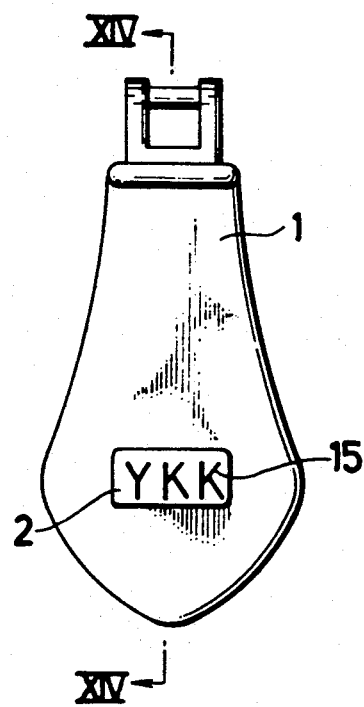
FIG. 13 is a front elevational view of an ornament having a plastics ornamental member on its one side.
Figure 14:
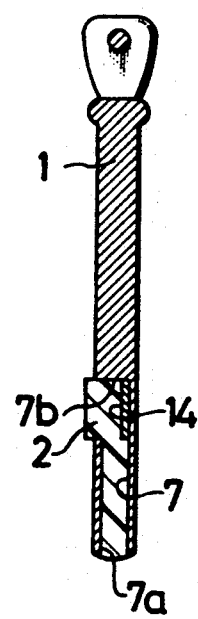
FIG. 14 is a cross-sectional view taken along line XIV—XIV of FIG. 13.

A pull tab for slide fasteners shown in FIGS. 13 and 14 includes a rectangular ornamental member 2 projecting from the front surface of a metal ornament body 1 for improving grippability of the slider pull tab. The ornamental member 2 is formed by injecting a melted synthetic resin material through an internal groove 7 of the metal ornament body 1 into a mold cavity complementary in contour to the shape of the ornamental member 2. A rectangular marking plate 14 having a mark 15 (characters in the illustrated embodiment) thereon is placed in the internal groove 7 at the outlet end 7b thereof. The synthetic resin material forming the ornamental member 2 is transparent and hence the mark 15 on the marking plate 14 can be observed through the transparent ornamental member 2. The mark 15 may be formed by embossing on the bottom wall of the internal groove 7.

Figure 15:
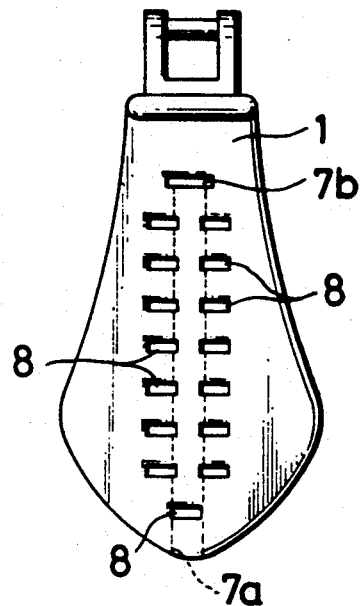
FIG. 15 is a front elevational view of a metal body used for making an ornament having a group of plastics ornament arranged in an ornamental pattern.
Figure 16:
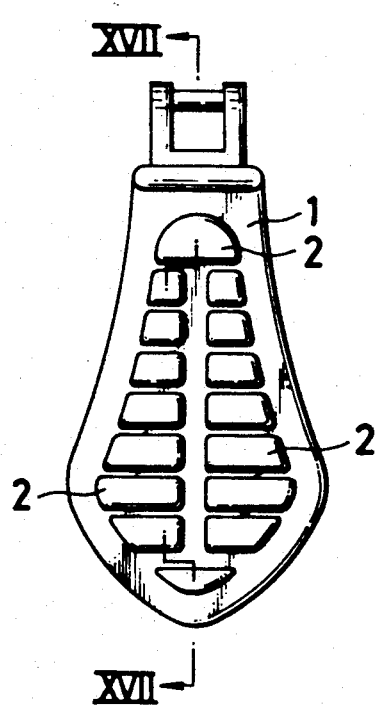
FIG. 16 is a front elevational view of an ornament made by using the metal body shown in FIG. 15.
Figure 17:
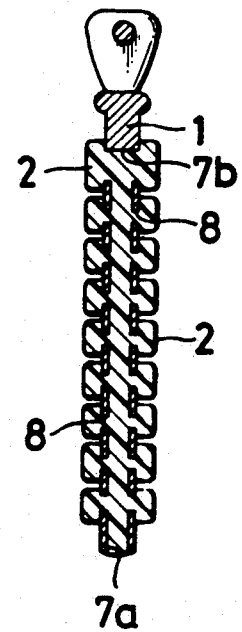
FIG. 17 is a cross-sectional view taken along line XVII—XVII of FIG. 16.

FIG. 15 shows a metal ornament body 1 used for making a slider pull tab having a plurality of ornamental members 2 arranged in a geometrical pattern as shown in FIG. 16. The metal ornament body 1 has an internal groove 7 extending from one end edge toward the opposite end edge of the metal ornament body 1 and terminating short of the opposite end edge, and two rows of rectangular holes 8 extending longitudinally along the internal groove 7 on opposite sides of the internal groove 7. Each of the rectangular holes 8 extends across the thickness of the metal ornament body 1 as shown in FIG. 17 and is connected at its inner end edge to the internal groove 7 as shown in FIG. 15. The metal ornament body 1 further has another rectangular hole 8 disposed adjacent to an inlet end 7a of the internal groove 7 and extending perpendicularly across the internal groove and also across the thickness of the metal ornament body 1. In injection molding, the metal ornament body 1 is set in a pair of relatively movable mold members each having a plurality of mold cavities complementary in contour to the respective ornamental members 2 molded on each side of the slider pull tab.

Figure 18:
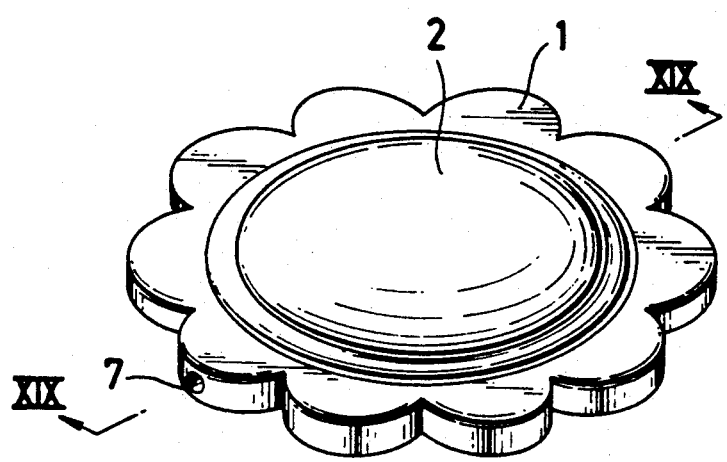
FIG. 18 is a perspective view of an ornament having a ring-shaped metal body made according to the present invention.
Figure 19:
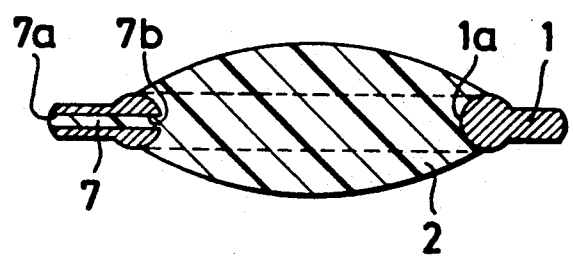
FIG. 19 is a cross-sectional view taken along line XIX—XIX of FIG. 18.

FIG. 18 shows an ornament for pendants, brooches or the like which includes a ring-shaped ornament body 1 made of metal and a generally circular disk-shaped ornament member 2 of synthetic resin integrally molded with the ring-shaped metal ornament body 1 to fill the central opening 1a thereof. The ring-shaped metal ornament body 1 has an internal groove 7 extending radially across the web of the metal ornament body 1. The internal groove 7 has one end 7a opening to the outer peripheral edge of the ring-shaped metal ornament body 1 and the opposite end 7b opening to the inner peripheral edge of the ring-shaped metal ornament body 1. In this embodiment, the central opening 1a of the ring-shaped metal ornament body 1 constitutes an enlarged outlet end 7b of the internal groove 7 which is open to front and rear surfaces of the metal ornament body 1. The ornamental member 2 is formed by injecting a melted synthetic resin material through the internal groove 7 into a pair of mold cavities defined in a pair of relatively movable mold members, respectively, and complementary in contour to the ornamental member 2.

As described above, the gate through which a melted synthetic resin material is injected is connected with the mold cavity indirectly through internal groove of the metal ornament body, so that an ornamental member molded of synthetic resin is free from a gate mark. Since the internal groove extends from an end edge of the metal ornament body, the gate mark is formed on the end edge of the metal ornament body. The gate mark thus formed is normally hidden from view and hence does not deteriorate the appearance of the ornament.

Obviously, various modifications and variations of the present invention are possible in the light of the above teaching. It is therefore to be understood that within the scope of the appended claims the invention may be practiced otherwise than as specifically described.

What is claimed is:

1. A method of making an ornament including an ornament body made of metal and an ornamental member formed of synthetic resin, said method comprising the steps of:
   (a) providing a pair of relatively movable mold members jointly defining therebetween a mold cavity complementary in contour to the shape of the ornamental member;
   (b) providing an ornament body made of metal and having at least one internal groove having one end opening to an end edge of the metal ornament body and an opposite end opening to at least one of front and rear surfaces of the metal ornament body;
   (c) holding the metal ornament body between confronting mold surfaces of the mold members, with said opposite end of the internal groove held in communication with the mold cavity; and
   (d) introducing a melted synthetic resin material through the internal groove of the metal ornament body into the mold cavity to form an ornamental member of synthetic resin integrally molded with the metal ornament body wherein said metal ornament body further includes an additional internal groove having one end opening to said end edge of the metal ornament body and an opposite end opening to the other of the front and rear surfaces of the metal ornament body, after the formation of the ornamental member, a melted synthetic resin material is injected through said additional internal groove into said mold cavity to form an additional ornamental member of synthetic resin integrally molded on said other surface of the metal ornament body, and the last-mentioned synthetic resin material is different from the first-mentioned synthetic resin material.

2. A method according to claim 1, wherein said metal ornament body further has at least one hole extending from said one surface of the metal ornament body to the internal groove.

3. A method according to claim 1, wherein said last-mentioned synthetic resin material has a different color to said first-mentioned synthetic resin material.

* * * * *